(12) United States Patent
Sung

(10) Patent No.: US 9,360,705 B2
(45) Date of Patent: Jun. 7, 2016

(54) INDOOR/OUTDOOR LIQUID CRYSTAL DISPLAY APPARATUS INCLUDING LED LIGHT SOURCE FOR IMPROVING LUMINANCE

(71) Applicant: Ji Yong Sung, Anyang-si (KR)

(72) Inventor: Ji Yong Sung, Anyang-si (KR)

( * ) Notice: Subject to any disclaimer, the term of this patent is extended or adjusted under 35 U.S.C. 154(b) by 0 days.

(21) Appl. No.: 14/401,888

(22) PCT Filed: Jun. 4, 2013

(86) PCT No.: PCT/KR2013/004881
§ 371 (c)(1),
(2) Date: Nov. 18, 2014

(87) PCT Pub. No.: WO2013/191395
PCT Pub. Date: Dec. 27, 2013

(65) Prior Publication Data
US 2015/0185557 A1 Jul. 2, 2015

(30) Foreign Application Priority Data
Jun. 22, 2012 (KR) .................. 10-2012-0067659

(51) Int. Cl.
*G02F 1/1335* (2006.01)
*G02B 5/04* (2006.01)
*G02B 5/30* (2006.01)

(52) U.S. Cl.
CPC .... *G02F 1/133606* (2013.01); *G02F 1/133528* (2013.01); *G02F 1/133602* (2013.01); *G02B 5/045* (2013.01); *G02B 5/30* (2013.01); *G02F 2001/133607* (2013.01)

(58) Field of Classification Search
CPC .............. G02F 1/133606; G02F 1/133611; G02F 1/133615; G02F 1/133602; G02F 1/133526; G02F 1/133504; G02F 1/133507; G02F 2001/133607; G02B 6/0053; G02B 6/0055; G02B 6/0038; G02B 6/0036
USPC ........... 349/62, 65, 57, 64; 362/31, 97.1–97.3
See application file for complete search history.

(56) References Cited

U.S. PATENT DOCUMENTS 5,919,551 A * 7/1999 Cobb, Jr. .................. G02B 5/00
359/530
6,086,212 A * 7/2000 Onishi .................. G02B 6/0023
349/65

(Continued)

FOREIGN PATENT DOCUMENTS

| JP | 2010-152276 | 7/2010 |
| KR | 10-2006-0064938 | 6/2006 |
| KR | 10-2006-0077181 | 7/2006 |

OTHER PUBLICATIONS

International Search Report for International Application No. PCT/KR2013/004881, dated Sep. 5, 2013.

*Primary Examiner* — Anne Hines
*Assistant Examiner* — Jose M Diaz
(74) *Attorney, Agent, or Firm* — Kile Park Reed & Houtteman PLLC

(57) ABSTRACT

A liquid crystal display apparatus includes a backlight unit, a liquid crystal panel, a first luminance increasing film, and a second luminance increasing film. The backlight unit upwardly emits light. The liquid crystal panel is disposed on the backlight unit to receive the light, and displays an image using characteristics of liquid crystal. The first luminance increasing film is interposed between the backlight unit and the liquid crystal panel, and increases luminance using a first prism part formed along an X-axis direction. The second luminance increasing film is interposed between the backlight unit and the first luminance increasing film, increases luminance using a second prism part formed along a Y-axis direction, and has a refractivity greater than the first luminance increasing film.

6 Claims, 3 Drawing Sheets

(56) References Cited

U.S. PATENT DOCUMENTS

| | | | | |
|---|---|---|---|---|
| 6,791,639 B2* | 9/2004 | Colgan | ............. | G02F 1/133526 349/61 |
| 7,628,527 B2* | 12/2009 | Kim | ......................... | F21V 7/05 362/608 |
| 8,085,364 B2* | 12/2011 | Travis | ................. | G02B 6/0053 349/65 |
| 8,814,410 B2* | 8/2014 | McCollum | ........... | G02B 3/0056 362/268 |
| 8,917,366 B2* | 12/2014 | Chang | .............. | G02F 1/133606 349/57 |
| 2008/0303975 A1* | 12/2008 | Mizuno | .................. | G02B 5/045 349/62 |
| 2010/0246015 A1* | 9/2010 | Iwasaki | ................ | G02B 6/0041 359/599 |
| 2011/0273907 A1* | 11/2011 | Iwasaki | ................ | G02B 6/0036 362/607 |
| 2012/0106063 A1* | 5/2012 | Mathew | ............ | G02F 1/133528 361/679.21 |
| 2012/0134139 A1* | 5/2012 | Jang | .................. | G02F 1/133615 362/97.2 |

* cited by examiner

INDOOR/OUTDOOR LIQUID CRYSTAL DISPLAY APPARATUS INCLUDING LED LIGHT SOURCE FOR IMPROVING LUMINANCE

TECHNICAL FIELD

The present invention relates to a liquid crystal display apparatus which displays an image using a light emitting diode (LED), and more particularly, to a liquid crystal display apparatus which displays an image by providing light generated from an LED to a liquid crystal having anisotropy.

BACKGROUND ART

Generally, a liquid crystal display (LCD) apparatus includes a liquid crystal panel including a liquid crystal to display an image and a backlight unit emitting light to the liquid crystal panel to supply the light to the liquid crystal panel.

Hereinafter, the liquid crystal panel, in order to display the image, includes a thin film transistor (TFT) substrate which includes a plurality of pixels having a TFT structure as a base, a color filter (CF) substrate which corresponds the TFT substrate and is configured to display colors of the image, and a liquid crystal interposed between the TFT substrate and the CF substrate. Also, the backlight unit includes a light emitting diode (LED) which generates light using semiconductor characteristics, and a light guide plate, on which the LED is disposed, guiding the light generated from the LED toward the liquid crystal panel.

Here, the LCD apparatus may further include a reflecting plate which reflects a light emitted from a lower portion of the light guide plate toward the liquid crystal panel, thereby efficiently utilizing the light. In this case, the LCD apparatus may also reflect a sunlight incident from outdoor through the reflecting plate toward the liquid crystal panel, thereby increasing luminance.

Also, the LCD apparatus may further include a diffusion sheet interposed between the light guide plate and the liquid crystal panel to diffuse light exiting from an upper portion of the light guide plate, and a prism sheet condensing light diffused from the diffusion sheet.

However, since a conventional prism sheet is composed of one film having one prism pattern formed in one direction, the conventional prism sheet cannot condense light exiting from the diffusion sheet in a direction perpendicular to the one direction.

DETAILED DESCRIPTION OF THE INVENTION

Technical Problem

The purpose of the present invention is to provide a liquid crystal display apparatus which is capable of condensing all of lights incident in all directions indoor/outdoor as well as minimizing light extinction caused by total reflection, thereby more increasing luminance.

Technical Solution

In order to achieve the above-mentioned purpose of the present invention, a liquid crystal display apparatus according to an aspect of the present invention includes a backlight unit, a liquid crystal panel, a first luminance increasing film, and a second luminance increasing film. The backlight unit upwardly emits light. The liquid crystal panel is disposed on the backlight unit to receive the light, and displays an image using characteristics of liquid crystal. The first luminance increasing film is interposed between the backlight unit and the liquid crystal panel, and increases luminance using a first prism part formed along an X-axis direction. The second luminance increasing film is interposed between the backlight unit and the first luminance increasing film, increases luminance using a second prism part formed along a Y-axis direction, and has a refractivity greater than the first luminance increasing film.

The second luminance increasing film according to an embodiment of the present invention may include a base film on which the second prism part is formed, and a coating layer formed on a lower surface of the base film, and having a refractivity greater than the first luminance increasing film. The coating layer may have a thickness in a ratio between 0.004 to 0.008 with respect to a thickness of the base film.

The second luminance increasing film according to an embodiment of the present invention may have a greater refractivity in a ratio of 1.01 to 1.06 with respect to the first luminance increasing film.

The liquid crystal display apparatus according to an embodiment of the present invention may further include first and second polarization films disposed between the liquid crystal panel and the first luminance increasing film and on the liquid crystal panel, respectively, and an advanced polarizer film interposed between the first luminance increasing film and the first polarization film to control a polarizing axis of the light, thereby increasing amount of light passing through the first polarization film. In this case, the advanced polarizer film may be integrally formed with the first polarization film.

The liquid crystal display apparatus according to an embodiment of the present invention may further include an anti-reflection part disposed on the second polarization film to transmit a portion or all of external light incident in an opposite direction to the backlight unit.

Advantageous Effects

According to the above-mentioned liquid crystal display apparatus, first and second luminance increasing films having a pair of first and second prism portions which are perpendicular to each other are stacked between a backlight unit and a liquid crystal panel, so that all of light exiting from the backlight unit in all directions may be condensed, thereby increasing luminance.

Also, the second luminance increasing film has higher refractivity than the first luminance increasing film, so that extinction of light exiting from the backlight unit, which is caused by total reflection, is minimized, thereby more increasing the luminance.

MODE OF THE INVENTION

Figure 1:
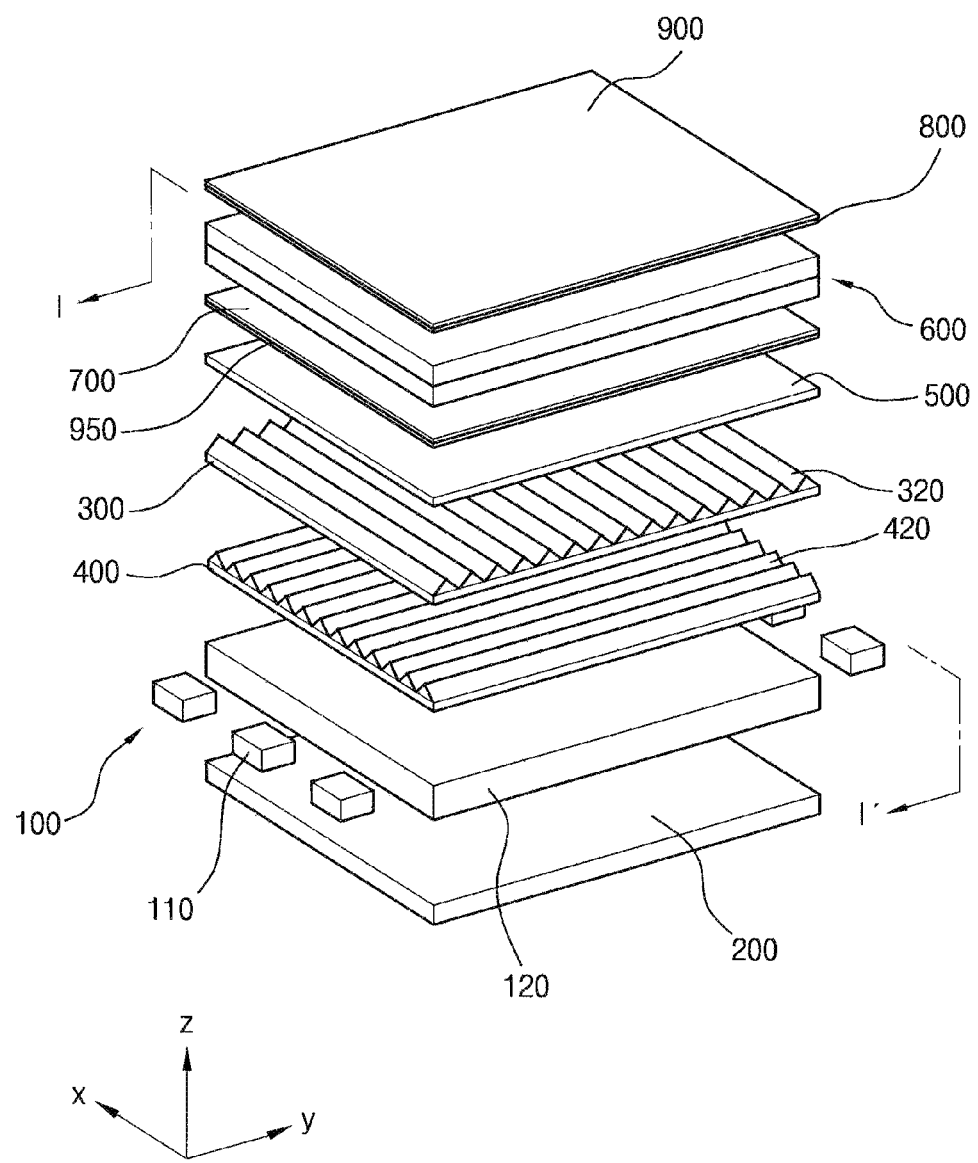
FIG. 1 is an exploded perspective view illustrating a liquid crystal display apparatus according to one embodiment of the present invention.

Hereinafter, a liquid crystal display apparatus according to embodiments of the present invention will be explained in detail with reference to enclosed drawings. It is important to understand that the present invention may be embodied in many alternate forms and should not be construed as limited to the example embodiments set forth herein. While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. In explaining each drawing, like numerals are used for lime elements. In the enclosed drawings, the sizes and relative sizes of layers and regions may be exaggerated for clarity. Like numerals refer to like elements throughout.

It will be understood that, although the terms first, second, etc. may be used herein to describe various elements, these elements should not be limited by these terms. These terms are used to distinguish one element from another. For example, a first element discussed below could be termed a second element without departing from the teachings of the present inventive concept. Also, a second element discussed below could be termed a first element without departing from the teachings of the present inventive concept.

The terms used in the present invention is only used to explain particular embodiments, and it is not intended to limit the present invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
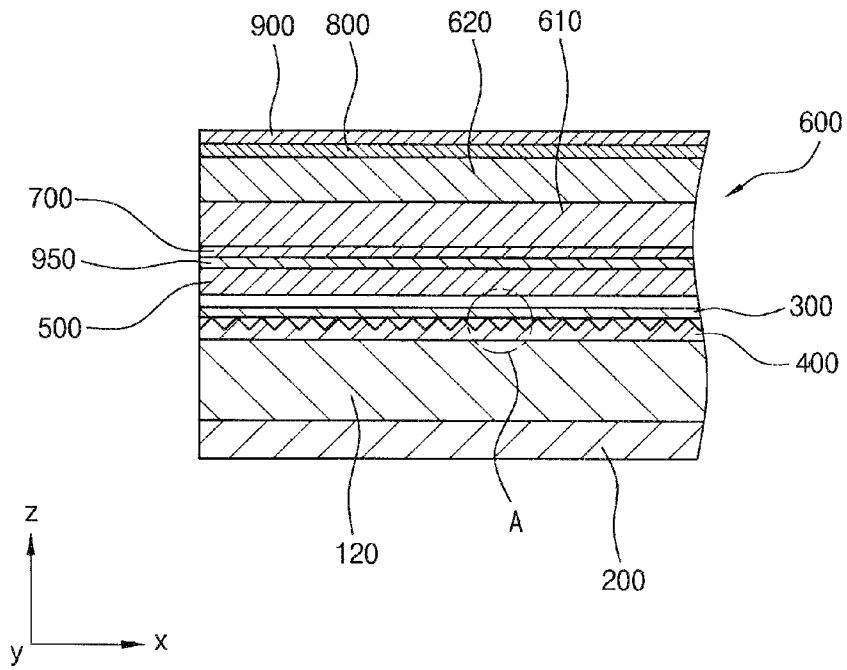
FIG. 2 is a cross-sectional view taken along line I-I' of an assembled liquid crystal display apparatus shown in FIG. 1.
Figure 3:
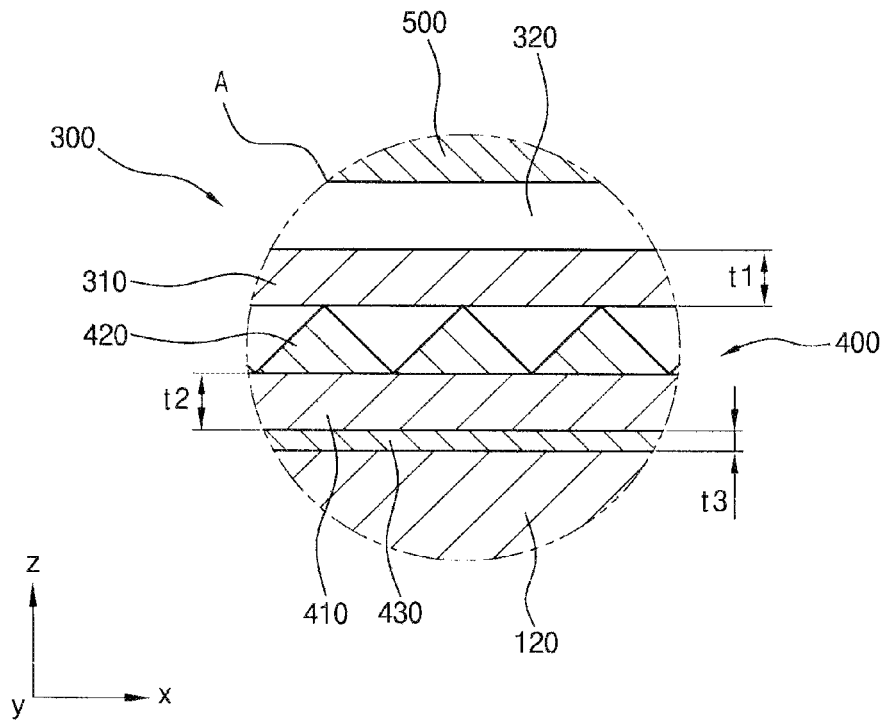
FIG. 3 is an enlarged cross-sectional view illustrating portion 'A' shown in FIG. 2.

FIG. 1 is an exploded perspective view illustrating a liquid crystal display apparatus according to one embodiment of the present invention, FIG. 2 is a cross-sectional view taken along line I-I' of an assembled liquid crystal display apparatus shown in FIG. 1, and FIG. 3 is an enlarged cross-sectional view illustrating portion 'A' shown in FIG. 2.

Referring to FIGS. 1 to 3, the liquid crystal display apparatus 1000 according to the embodiment of the present invention includes a backlight unit 100, a reflecting plate 200, a first luminance increasing film 300, a second luminance increasing film 400, a diffusion sheet 500, a liquid crystal panel 600, a first polarization film 700, a second polarization film 800, and an anti-reflection part 900.

The backlight unit 100 upwardly emits light. The backlight unit 100 may be structured to be an edge type which is suitable for a minimized or slimmed display electronic apparatus. In particular, the backlight unit 100 includes a light emitting diode 110 which generates light using semiconductor characteristics and is used for a long time without replacement, and a light guide plate 120 on which the light emitting diode 110 is disposed on at least one side and upwardly guides the light generated from the light emitting diode 110.

A predetermined number of the light emitting diodes 110 may be arranged on the side of the light guide plate 120 along a line based on a size of the liquid crystal display apparatus 1000. Alternatively, the light emitting diodes 110 may be disposed on both side surfaces or three side surfaces corresponding to the light guide plate 120 to increase amount of light exiting from the light guide plate 120. Also, the light emitting diodes 110 may be individually disposed as an element shape, and be arranged in a package shape.

A dot pattern (not shown) may be formed on an upper surface of the light guide plate 120 to uniformly diffuse the light which is generated from the light emitting diode 110 and guided. The light guide plate 120 may include a synthetic resin such as polymethyl methacrylate (PMMA) to guide the light incident from the light emitting diode 110 in high efficiency.

The reflecting plate 200 is disposed under the light guide plate 120 of the backlight unit 110. The reflecting plate 200 upwardly reflects the light downwardly exiting from the light guide plate 120 among the light incident into the light guide plate 120 so that maximum amount of light exits from an upper portion of the light guide plate 120. Thus, luminance of an image displayed on the liquid crystal display apparatus 1000 may be basically increased.

The first luminance increasing film 300 is disposed on the light guide plate 120. The first luminance increasing film 300 includes a first prism part 320, which is formed on an upper surface of a first base film 310 in an X-axis direction to upwardly condense the light exiting from the light guide plate 120 in a Y-axis direction.

In order to efficiently condense the light by the first prism part 320, preferably, an angle of a peak may be about 88 to 90 degrees, a height of the peak may be about 24 to 26 µm, and a pitch of the peak may be about 48 to 52 µm. Also, more preferably, the angle, height, and pitch of the first prism part 320 may be about 90 degrees, 25 µm, and 50 µm, respectively. The first prism part 320 may include an acrylic resin which has a predetermined hardness and good workability to maintain a shape thereof.

Also, the first base film 310 preferably has a thickness t1 of about 247 to 253 µm to securely support a shape of the first prism part 320, and more preferably, the thickness t1 may be 250 µm. Thus, an overall thickness of the first luminance increasing film 300 may be about 272 to 282 µm which is summation of the thickness t1 of the first base film 310 and a height of the first prism part 320, and preferably about 277 µm. The first base film 310 may include polyester resin having high workability.

The second luminance increasing film 400 is interposed between the light guide plate 120 and the first luminance increasing film 300. The second luminance increasing film 400 includes a second prism part 420, which is formed on an upper surface of a second base film 320 in the Y-axis direction to upwardly condense the light exiting from the light guide plate 120 in the X-axis direction, so that the light is incident into the first luminance increasing film 300. Here, the second base film 410 and the second prism part 420 have similar structure as the first base film 310 and the first prism part 320, respectively, except a direction, in which the second prism part 420 is formed, is perpendicular to the first prism part 320, and thus, any repetitive explanation will be omitted.

As described above, the first and second luminance increasing films 300 and 400 having the pair of the first and second prism parts 320 and 420 which are perpendicular to each other are stacked on the backlight unit 100, so that all of the light exiting from the backlight unit 100 may be condensed in all directions, thereby additionally increasing luminance of the liquid crystal panel 600 disposed on the first luminance increasing film 300.

The second luminance increasing film 400 may be formed to have a refractivity greater than the first luminance increasing film 300. Then, a refractive angle of the light emitted from the light guide plate 120 is greatly changed between the second luminance increasing film 400 and the first luminance increasing film 300, and majority of totally reflected light is reflected from the reflecting plate 200 disposed thereunder to exit upwardly, so that elimination of light in a side direction may be minimized. Therefore, an effect of additional increasing luminance may be expected.

When the second luminance increasing film 400 has high refractivity of less than about 1.01 with respect to the first luminance increasing film 300, a refractive angle with the first luminance increasing film 300 is too small so that majority of the totally reflected light may not be reflected from the reflecting plate 200, thereby not preferable. Also, When the second luminance increasing film 400 has high refractivity of more than about 1.06 with respect to the first luminance increasing film 300, majority of the light may be totally reflected between the first luminance increasing film 300, thereby not preferable. Thus, the refractivity of the second luminance increasing film 400 may preferably be a ratio of about 1.01 to 1.06 with respect to the first luminance increasing film 300. Also, the refractivity of the second luminance increasing film 400 may more preferably be about 1.03 with respect to the first luminance increasing film 300. For example, when the refractivity of the first luminance increasing film 300 is about 1.54, the refractivity of the second luminance increasing film 400 may be about 1.59.

In order to realize the above-mentioned refractivity, the second luminance increasing film 400 may further include a coating layer 430 formed on a lower surface of the second base film 410. The coating layer 430 may include a similar resin material as the second base film 410 to be easily formed on the lower surface of the second base film 410. The coating layer 430 may preferably have a thickness t3 of a ratio of about 0.004 to 0.008 with respect to the thickness t2 of the second base film 410 to have the refractivity within the above-mentioned range. For example, when the thickness t2 of the second base film 410 is about 247 to 253 μm, the thickness t3 of the coating layer 430 may be about 1 to 2 μm, and preferably about 1.5 μm. Also, the second luminance increasing film 400 may have a low shrinkage ratio of about 35% with respect to the first luminance increasing film 300 by the coating layer 430.

The diffusion sheet 500 is disposed on the first luminance increasing film 300. The diffusion sheet 500 diffuses the condensed light, which has passed through the first and second luminance increasing films 300 and 400, to entirely uniformize the luminance. It is for displaying the image displayed on the liquid crystal panel 600 disposed thereon as entirely uniform luminance. In order to the above, the diffusion sheet 500 may have dot patterns (not shown) formed on at least one surface to diffuse the light, or beads (not shown) formed therein.

Also, in the liquid crystal display apparatus 1000, when a distance between the backlight unit 100 and the liquid crystal panel 600 for displaying the image explained in the following is very narrow or a size thereof has a wide size, a second diffusion sheet (not shown) having the same structure as the diffusion sheet 500 may further be interposed between the diffusion plate 120 and the second luminance increasing film 400 to add diffusion function of the light.

The liquid crystal panel 600 is disposed on the diffusion sheet 500. The liquid crystal panel 600 displays a substantial image using the light exiting from a liquid crystal (not shown) having optical characteristics and the diffusion sheet 500. The liquid crystal panel 600 includes a first substrate 610, and a second substrate 620 which is combined with the first substrate 610 to interpose the liquid crystal therebetween.

The first substrate 610 is a thin film transistor (TFT) substrate on which TFTs of switching elements are formed in a matrix shape. A source electrode and a gate electrode of each of the TFTs are connected to a data line and a gate line, respectively, and a drain electrode thereof is connected to a pixel electrode including a transparent conductive material.

The second substrate 620 is a color filter substrate on which RGB pixels for realizing colors are formed in a thin film shape. A common electrode including a transparent conductive material is formed on the second substrate 620. Also, the liquid crystal panel 600 may be connected to a driving circuit part (not shown), which electrically controls the liquid crystal to control a gate signal and a data signal to realize the image.

The first and second polarization films 700 and 800 are disposed between the liquid crystal panel 600 and the diffusion sheet 500, and on the liquid crystal panel 600, respectively. The first and second polarization films 700 and 800 have polarizing axes perpendicular to each other. The light having passed through the polarizing axis of the first polarization film 700 passes through the liquid crystal controlled based on the image, and some of the light is continuously changed to pass through the second polarization film 800, thereby realizing the image.

The liquid crystal display apparatus 1000 may further include an advanced polarizer film 950 which is disposed between the diffusion sheet 500 and the first polarization film 700 to control a polarizing axis of the light diffused by the diffusion sheet 50 so that greater amount of light passes through the first polarization film 700 to increase luminance. The advanced polarizer film 950 may be attached to the first polarization film 700 in an integral structure so that an entire thickness of the liquid crystal display apparatus 1000 may not be affected.

The anti-reflection part 900 is disposed on the second polarization film 800. The anti-reflection part 900 prevents reflection of a light incident into the liquid crystal panel 600 from the outside, in particular, a sunlight having greatly higher luminance than the image displayed on the liquid crystal panel 600, and thus transmits majority of the light. Thus, the anti-reflection part 900 transmits the majority of the sunlight to prevent visibility decrease in which the image displayed on the liquid crystal panel 600 is invisible by diffusion and reflection of the sunlight, to reflect again the light having passed through the anti-reflection part 900 toward the reflection plate 200 to exit toward the liquid crystal panel 600, thereby greatly increasing the luminance of the liquid crystal panel 600 by the sunlight. Here, the anti-reflection part 900 may be configured to entirely transmit the sunlight without reflection.

Alternatively, the anti-reflection part 900 may diffuse the sunlight in all around instead of transmitting the sunlight as described above so that the sunlight is not recognized, and thus, the image of the liquid crystal panel 600 may be correctly recognized. The function of diffusing the sunlight in the anti-reflection part 900 may be integrated into the second polarization film 800, thereby omitting the anti-reflection part 900.

Hereinafter, luminance of the liquid crystal display apparatus 1000 of the present invention is actually tested indoor and outdoor using an apparatus shown in FIGS. 4 and 5 to check the effect thereof.

Figure 4:
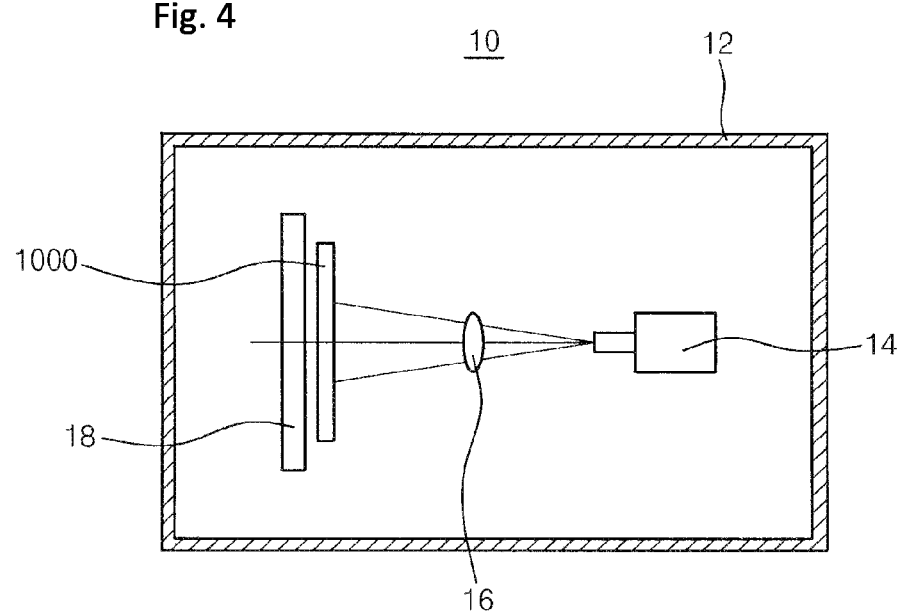
FIG. 4 is a conceptual view illustrating an apparatus for detecting indoor luminance of the liquid crystal display apparatus shown in FIG. 1.
Figure 5:
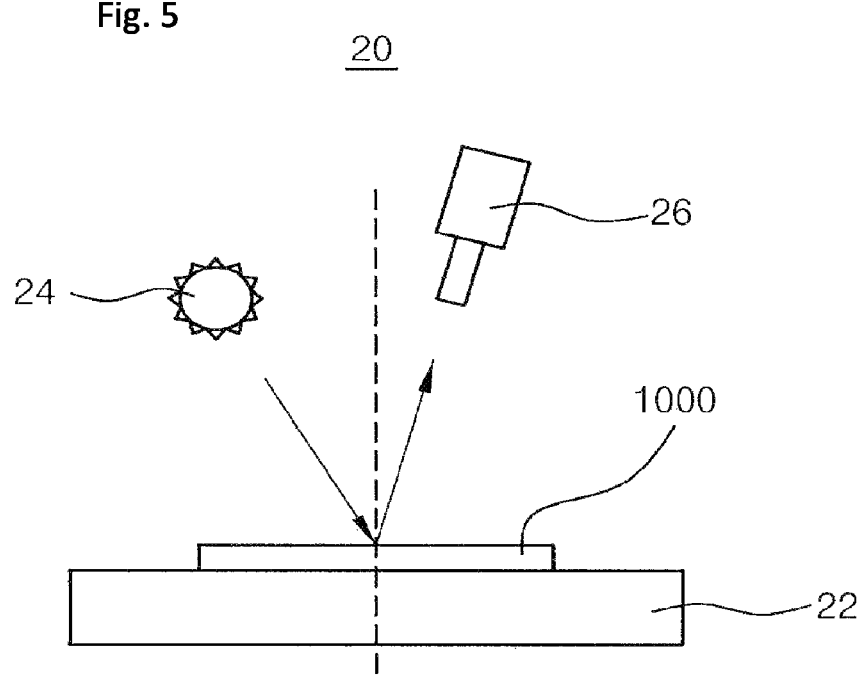
FIG. 5 is a conceptual view illustrating an apparatus for detecting outdoor luminance of the liquid crystal display apparatus shown in FIG. 1.

FIG. 4 is a conceptual view illustrating an apparatus for detecting indoor luminance of the liquid crystal display apparatus shown in FIG. 1, and FIG. 5 is a conceptual view illustrating an apparatus for detecting outdoor luminance of the liquid crystal display apparatus shown in FIG. 1.

Referring to FIGS. 1 and 4, the apparatus 10 for indoor detecting the liquid crystal display apparatus 1000 of the present invention includes a darkroom part 12 which provides a darkroom space, a light detecting part 14 which detects a screen light exiting from the liquid crystal display apparatus 1000, a light controlling part 16 which controls a viewing angle range between the light detecting part 14 and the liquid crystal display apparatus 1000, and a supporting part 18 which supports the liquid crystal display apparatus 1000 on a rear surface of the liquid crystal display apparatus 1000.

Thus, luminance of the liquid crystal display apparatus 1000 according to the embodiment of the present invention and a liquid crystal display apparatus according to a comparative embodiment are detected using the above-mentioned indoor detecting apparatus 10 to get result of the following Table 1.

The apparatus of the comparative embodiment includes a liquid crystal display panel including a TFT substrate, a color filter (hereinafter, referred to as CF) substrate configured to realize colors of an image, and a liquid crystal interposed between the TFT substrate and the CF substrate, an LED backlight unit which generates a side surface light using semiconductor characteristics, a light guide plate disposed under the LED panel to guide light generated from the backlight unit toward the liquid crystal display panel, a reflecting plate which reflects the light exiting from a lower portion of the light guide plate toward the liquid crystal display panel to efficiently utilize the light, a diffusion sheet interposed between the light guide plate and the liquid crystal display panel to diffuse the light exiting from the upper portion of the light guide plate, and a prism sheet which condenses the light diffused by the diffusion sheet.

TABLE 1

| Classification | Detected Value of Luminance | | | | | | | |
|---|---|---|---|---|---|---|---|---|
| (Unit) | 1 | 2 | 3 | 4 | 5 | 6 | 7 | Mean |
| Comparative Embodiment (nit) | 431 | 423 | 454 | 445 | 448 | 434 | 448 | 440 |
| Example Embodiment (nit) | 890 | 888 | 887 | 886 | 887 | 887 | 883 | 887 |
| Rate of Climb (%) | 109 | 113 | 109 | 108 | 107 | 114 | 109 | 110 |

Referring to Table 1, the liquid crystal display apparatus 1000 of the embodiment of the present invention was checked that luminance was increased by about 110% with respect to the liquid crystal display apparatus of the comparative embodiment in the same condition. When compared with a liquid crystal display apparatus 1000 having luminance of about 600 nit of a commercial reference according to the comparative embodiment, the liquid crystal display apparatus of the embodiment of the present may be expected to finally get an indoor luminance of about 1,260 nit with respect to the mean rate of climb (110%) of the above-mentioned Table 1.

Referring to FIGS. 1 and 5, an apparatus 20 for outdoor detecting the liquid crystal display apparatus 1000 of the present invention includes a stage 22 on which the liquid crystal display apparatus 1000 is disposed, a light irradiating part 24 which irradiates light of about 80,000 lux corresponding to a sunlight to the liquid crystal display apparatus 1000 disposed on the stage 22, and a light detecting part 26 which detects luminance of light reflected from the liquid crystal display apparatus 1000 over the liquid crystal display apparatus 1000.

Here, the light irradiating part 24 irradiates light at an incident angle of about 30 degrees with respect to an axis perpendicular to the liquid crystal display apparatus 1000, and the light detecting part 26 detects light at a position of about 15 degrees from a position corresponding to the light irradiating part 14 with respect to the axis. The reason of the above is that when the light is incident or detected at different angles from the above-mentioned angles, reflection may be generated on a surface of the liquid crystal display apparatus 1000, so that luminance may not be correctly detected.

Thus, luminance of the liquid crystal display apparatus 1000 according to the embodiment of the present invention and the liquid crystal display apparatus according to the comparative embodiment are detected using the above-mentioned outdoor detecting apparatus 20 to get result of the following Table 2.

TABLE 2

| Classification | Detected Value of Luminance | | | | | | | |
|---|---|---|---|---|---|---|---|---|
| (Unit) | 1 | 2 | 3 | 4 | 5 | 6 | 7 | Mean |
| Comparative Embodiment (nit) | 431 | 423 | 454 | 445 | 448 | 434 | 448 | 440 |
| Example Embodiment (nit) | 1151 | 1157 | 1163 | 1150 | 1150 | 1157 | 1158 | 1155 |
| Rate of Climb (%) | 167 | 174 | 156 | 158 | 157 | 167 | 158 | 163 |

Referring to Table 2, the liquid crystal display apparatus 1000 of the embodiment of the present invention was checked that luminance was increased by about 163% with respect to the liquid crystal display apparatus of the comparative embodiment in the same condition. Also, when compared with a liquid crystal display apparatus having luminance of about 600 nit of a commercial reference according to the comparative embodiment, the liquid crystal display apparatus of the embodiment of the present may be expected to finally get an indoor luminance of about 1,578 nit with respect to the mean rate of climb (168%) of the above-mentioned Table 2.

INDUSTRIAL APPLICABILITY

According to the liquid crystal display apparatus of the present invention, when a touch panel for inputting information of a user is disposed on the liquid crystal panel, luminance decreased of about 22 to 24% by the above is compensated by luminance increased by the structure of the present invention, so that the liquid crystal display apparatus of the present invention may be actively applied to a liquid crystal display apparatus for a touch panel.

Also, when other liquid crystal display apparatus without a backlight unit is additionally disposed on the liquid crystal display apparatus 1000 of the present invention, the other liquid crystal display apparatus may display an additional image using the increased luminance, so that the liquid crystal display apparatus 1000 of the present invention may be actively applied to a multi-dual liquid crystal display apparatus. In the multi-dual liquid crystal display apparatus, a background image is displayed by the liquid crystal display apparatus 100, and a main image is displayed by the other liquid crystal display apparatus, so that the multi-dual liquid crystal display apparatus may be used for advertisement or information transfer. Furthermore, the present invention may also be applied to a direct illumination type liquid crystal display apparatus including a direct type LED disposed directly under a display panel and a diffusion plate as well as an edge illumination type liquid crystal display apparatus.

The present invention has been particularly shown and described with reference to the embodiments illustrated in the appended drawings. The embodiments are, however, provided as examples only used for a better understanding of the present invention. It would be obvious to those of ordinary skill in the art that the above embodiments are to cover all modifications, equivalents, and alternatives falling within the scope of the invention. Accordingly, it will be understood that various changes in form and details may be made therein without departing from the spirit and scope of the following claims.

The invention claimed is:

1. A liquid crystal display apparatus comprising:
   a backlight unit upwardly emitting light;
   a liquid crystal panel disposed on the backlight unit to receive the light, and displaying an image using characteristics of liquid crystal;
   a first luminance increasing film interposed between the backlight unit and the liquid crystal panel, and increasing luminance using a first prism part formed along an X-axis direction; and
   a second luminance increasing film interposed between the backlight unit and the first luminance increasing film, increasing luminance using a second prism part formed along a Y-axis direction, and having a refractivity greater than the first luminance increasing film,
   wherein the second luminance increasing film comprises:
      a base film on which the second prism part is formed; and
      a coating layer formed on a lower surface of the base film, and having a refractivity greater than the first luminance increasing film.

2. The liquid crystal display apparatus of claim 1, wherein the coating layer has a thickness in a ratio between 0.004 to 0.008 with respect to a thickness of the base film.

3. The liquid crystal display apparatus of claim 1, wherein the second luminance increasing film has a greater refractivity in a ratio of 1.01 to 1.06 with respect to the first luminance increasing film.

4. The liquid crystal display apparatus of claim 1, further comprising:
   first and second polarization films disposed between the liquid crystal panel and the first luminance increasing film and on the liquid crystal panel, respectively; and
   an advanced polarizer film interposed between the first luminance increasing film and the first polarization film to control a polarizing axis of the light, thereby increasing amount of light passing through the first polarization film.

5. The liquid crystal display apparatus of claim 4, wherein the advanced polarizer film is integrally formed with the first polarization film.

6. The liquid crystal display apparatus of claim 1, further comprising:
   first and second polarization films disposed between the liquid crystal panel and the first luminance increasing film and on the liquid crystal panel, respectively; and
   an anti-reflection part disposed on the second polarization film to transmit a portion or all of external light incident in an opposite direction to the backlight unit.

* * * * *